US008730621B2

(12) United States Patent
Brandts et al.

(10) Patent No.: US 8,730,621 B2
(45) Date of Patent: May 20, 2014

(54) SOLDER BALL BRIDGE, AND METHODS OF MAKING

(75) Inventors: Jackson William Brandts, Watertown, MN (US); Kevin J. Schulz, Apple Valley, MN (US); Christopher Michael Unger, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/544,067

(22) Filed: Jul. 9, 2012

(65) Prior Publication Data

US 2014/0008101 A1  Jan. 9, 2014

(51) Int. Cl.
*G11B 5/127* (2006.01)
(52) U.S. Cl.
USPC ....................................................... 360/264.2
(58) Field of Classification Search
USPC ....................................................... 360/234.5
See application file for complete search history.

(56) References Cited

U.S. PATENT DOCUMENTS

| | | | |
|---|---|---|---|
| 4,761,699 A | 8/1988 | Ainslie et al. | |
| 5,530,604 A | 6/1996 | Pattanaik | |
| 6,046,882 A * | 4/2000 | Pattanaik et al. | 29/878 |
| 6,523,250 B2 * | 2/2003 | Erpelding et al. | 29/603.04 |
| 7,006,330 B1 * | 2/2006 | Subrahmanyam et al. | 360/234.5 |
| 7,286,325 B2 * | 10/2007 | Hernandez et al. | 360/234.5 |
| 7,417,827 B2 * | 8/2008 | Tsuchida et al. | 360/234.5 |
| 7,929,248 B2 | 4/2011 | Zhu et al. | |
| 2008/0170326 A1 | 7/2008 | Feng et al. | |
| 2009/0195938 A1 | 8/2009 | Yao et al. | |
| 2010/0097726 A1 | 4/2010 | Greminger et al. | |
| 2010/0097727 A1 | 4/2010 | Greminger | |
| 2010/0128394 A1 | 5/2010 | Limmer et al. | |
| 2010/0321829 A1 | 12/2010 | Hutchinson et al. | |

* cited by examiner

*Primary Examiner* — Mark Blouin
(74) *Attorney, Agent, or Firm* — HolzerIPLaw, PC

(57) ABSTRACT

An electrical connection between a first element and a second element formed by a solder ball bridge having at least three solder balls in physical contact with each other extending to electrically connect the first element and the second element. The solder ball bridge is particularly suitable for a disc drive system, to form an electrical connection between two elements such as between a piezoelectric microactuator element and the suspension assembly. Methods of making a solder ball bridge are also provided.

20 Claims, 5 Drawing Sheets

SOLDER BALL BRIDGE, AND METHODS OF MAKING

BACKGROUND

Hard disc drive systems (HDDs) typically include one or more data storage discs. A transducing head carried by a slider is used to read from and write to a data track on a disc. The slider is carried by an arm assembly that includes an actuator arm and a suspension assembly, which can include a separate gimbal structure or can integrally form a gimbal.

The density of data stored on a disc continues to increase, requiring more precise positioning of the transducing head. Conventionally, in many systems, head positioning is accomplished by operating the actuator arm with a large scale actuation motor, such as a voice coil motor, to position a head on a flexure at the end of the actuator arm. A high resolution head positioning mechanism, or microactuator, is advantageous to accommodate the high data density. The microactuator is often a piezoelectric microactuator.

Electrical connections between various elements in the HDD system should be strong, resist breakage, and have good electrical conductivity. Improved electrical connections are always desirable.

SUMMARY

One particular embodiment of this disclosure is an electrical connection between a first element and a second element. The electrical connection comprises at least three solder balls in physical contact with each other extending across a gap between the first element and the second element to electrically connect the elements.

These and various other features and advantages will be apparent from a reading of the following detailed description.

BRIEF DESCRIPTION OF THE DRAWING

The invention may be more completely understood in consideration of the following detailed description of various embodiments of the invention in connection with the accompanying drawing, in which.

DETAILED DESCRIPTION

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present invention. The following detailed description, therefore, is not to be taken in a limiting sense. While the present invention is not so limited, an appreciation of various aspects of the invention will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

This disclosure provides one particular embodiment as an electrical connection between a first element and a second element. The electrical connection comprises at least three solder balls in physical contact with each other extending across a gap between the first element and the second element to electrically connect the elements.

Another particular embodiment of this disclosure is a disc drive that has a first element and a second element physically spaced from the first element. A solder ball bridge electrically connects the first element with the second element, with the solder ball bridge comprising at least three solder balls.

This disclosure also provides a particular embodiment that is a method of making an electrical connection in a disc drive between a first element and a second element. The method includes attaching a first solder ball to the first element and attaching a second solder ball to the second element, thus creating an electrical connection between the first element and the second element through the first solder ball and the second solder ball without reflowing either of the solder balls.

Figure 1:
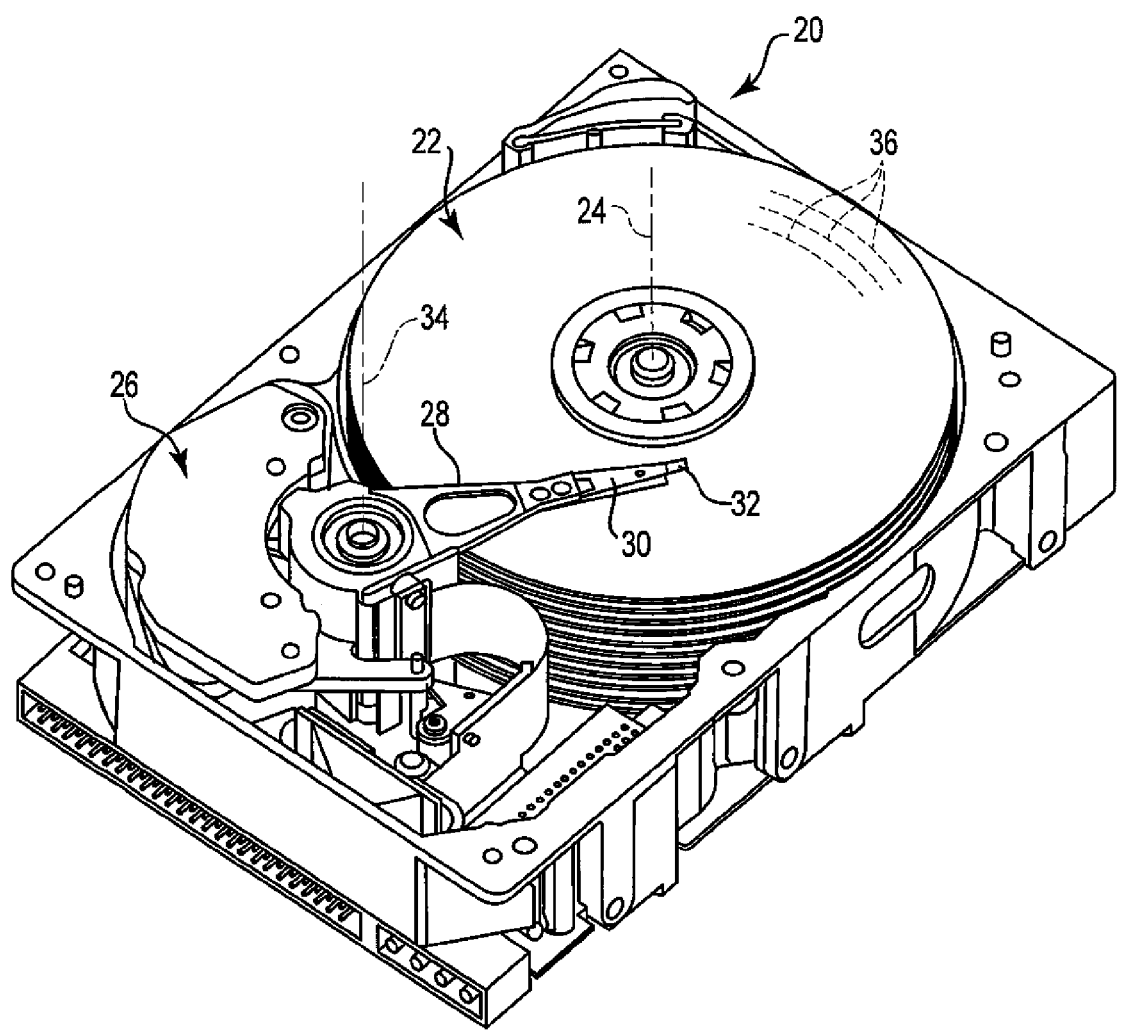
FIG. 1 is a perspective view of an exemplary hard disc drive (HDD) system.

FIG. 1 is a perspective view of an exemplary hard disc drive (HDD) system 20 that includes a magnetic storage disc 22 configured to rotate about an axis 24, an actuation motor 26 (e.g., a voice coil motor), an actuator arm 28, a suspension assembly 30, and a slider 32 carrying a transducing or read/write head (not shown). Slider 32 is supported by suspension assembly 30, which in turn is supported by actuator arm 28. Actuation motor 26 is configured to pivot actuator arm 28 about an axis 34, in order to sweep suspension 30 and slider 32 in an arc across a surface of rotating disc 22 with slider 32 "sliding" or "flying" across disc 22 on a cushion of air. The read/write head carried by slider 32 can be positioned relative to selected concentric data tracks 36 of disc 22 by a piezoelectric microactuator, not seen in FIG. 1. It should be noted that a stack of co-rotating discs 22 can be provided, with additional actuator arms 28, suspension assemblies 30, and sliders 32 carrying read/write heads for reading and writing at top and bottom surfaces of each disc 22 in the stack.

The present disclosure provides structures and methods for providing an electrically conductive connection between elements of HDD system 20. An electrically conductive connection can be made, for example, between the slider and read/write head, between the slider and circuitry, between the microactuator and circuitry, from the microactuator to ground, and from the slider to ground.

Figure 2:
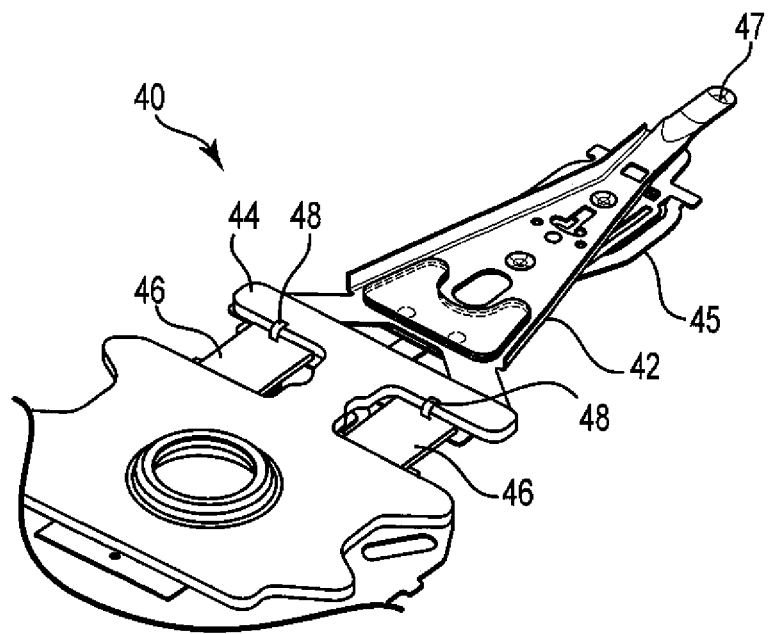
FIG. 2 is a perspective view of an actuator arm incorporating a solder ball bridge electrically connecting the piezoelectric microactuator with the arm.

Referring to FIG. 2, a particular actuator arm 40 is illustrated. Actuator arm 40 includes a suspension assembly or arm 42 with a stiffening base plate 44. This embodiment of actuator arm 40 includes a gimbal 45 and a lift tab 47 at the distal end of suspension arm 42. The slider, which includes a read/write transducer, is mounted to the underside of gimbal 45 and is not seen in this illustration. Actuator arm 40 includes, in this embodiment, two piezoelectric microactuators 46.

Each microactuator 46 is electrically connected (i.e., grounded) to base plate 44 with a conductive, solder ball bridge 48 according to the present disclosure. The solder ball bridge 48 is formed by the placement of at least two, in some embodiments at least three, individually positioned solder balls. Solder ball bridge 48 may be referred to as a multiple-ball or multi-ball solder bridge, or merely as a solder bridge.

Figure 3:
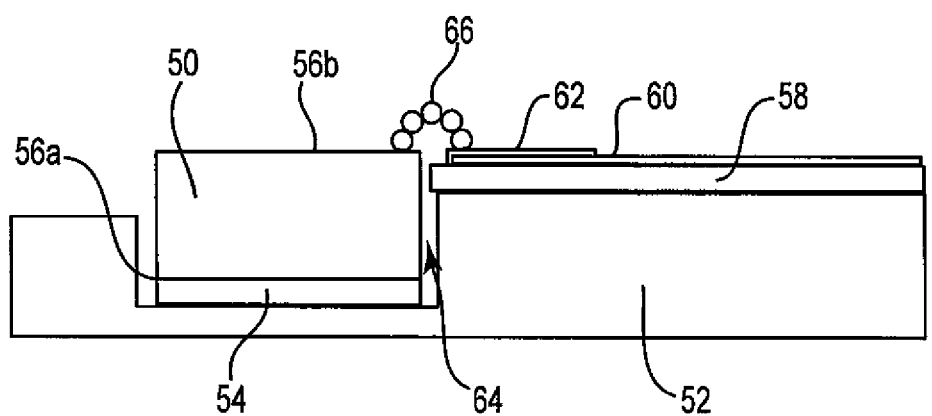
FIG. 3 is a side view of an embodiment of a solder ball bridge where the piezoelectric microactuator is recessed and the solder ball bridge spans an air gap to provide an electrical connection between the co-planar circuit and the top contact of the microactuator.

FIG. 3 illustrates an embodiment of a solder ball bridge electrically connecting two generally co-planar elements having an air gap therebetween. In FIG. 3, the microactuator is recessed and the solder ball bridge spans an air gap to provide an electrical connection between the circuit and the top contact of the microactuator.

As seen in FIG. 3, a suspension arm 52 has a microactuator 50 secured thereto with a conductive adhesive 54 (e.g., a conductive epoxy) in a recessed pocket formed in suspension arm 52. The depth of the pocket is slightly less than the thickness of microactuator element 50 so microactuator 50 extends slightly above suspension arm 52. As an example, a microactuator element with a thickness of 0.004 inches (0.10 mm) can have a recess approximately 0.003 inches (0.08 mm) deep. Electrical connection between a first or bottom side 56a of microactuator 50 is provided by a conductive path through conductive adhesive 54 to suspension arm 52. Generally, suspension arm 52 is tied to ground. An insulating layer 58 is present on the surface of suspension arm 52 upon which is a circuit 60 with traces 62 near microactuator 50. The level of traces 62 is generally vertically even or planar with the top of surface 56b of microactuator 50. A gap 64, in some embodiments being at least about 5 micrometers wide, spaces microactuator 50 from suspension arm 52, insulating layer 58 and circuit 60. A multi-ball solder bridge 66 forms an electrical connection between circuit traces 62 and microactuator surface 56b.

Figure 4:
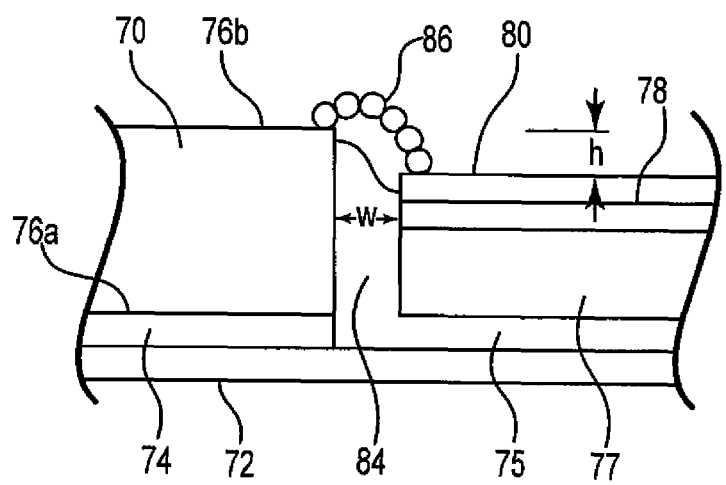
FIG. 4 is an enlarged side view of an embodiment of a solder ball bridge where the piezoelectric microactuator is recessed and a solder ball bridge spans an air gap to provide an electrical connection between the non-planar circuit and the top contact of the microactuator.

FIG. 4 illustrates an embodiment of a solder ball bridge electrically connecting two parallel yet vertically displaced, or non-planar, elements having a gap therebetween. The solder ball bridge bridges the gap to provide an electrical connection between the circuit and the top contact of the microactuator.

In FIG. 4, a piezoelectric microactuator 70 is secured to suspension arm 72 with a conductive adhesive 74 (e.g., a conductive epoxy); microactuator 70, in this embodiment, is not position in a recessed pocket formed in suspension arm 72, but in other embodiments may be. Electrical connection between a first or bottom side 76a of microactuator 70 is provided by a conductive path through conductive adhesive 74 to suspension arm 72, which is tied to ground.

A base plate 77 is secured to suspension arm 72 with a structural adhesive 75 (e.g., a non-conductive epoxy). A conductive layer 78 (e.g., a plated gold (Au) layer) is present on the surface of base plate 77 onto which is a circuit with traces 80. In this construction, the level of traces 80 is generally vertically displaced from top surface 76b of microactuator 70 by a distance of h. A gap 84 spaces microactuator 50 from suspension arm 52, insulating layer 58 and circuit 60; in this embodiment gap 84 has a width w with structural adhesive 75 therein, although in other embodiments gap 84 may be an air gap. A multi-ball solder bridge 86 forms an electrical connection between circuit traces 80 and microactuator surface 76b.

Figure 5A:
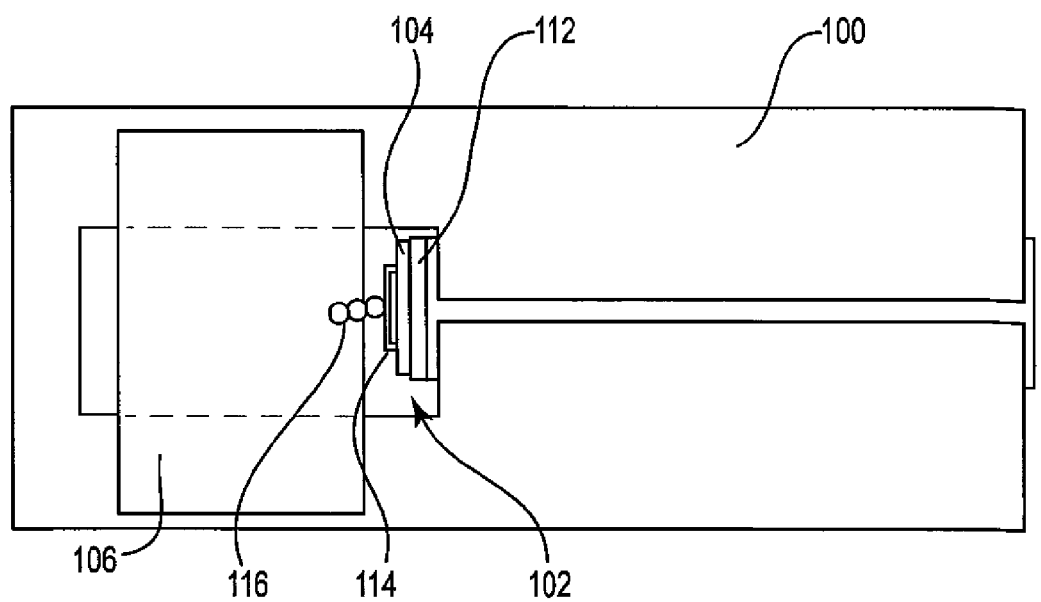
FIG. 5A is a top view of an embodiment of a solder ball bridge where the circuit is bent and passed through an aperture in the suspension assembly to provide an electrical connection to the piezoelectric microactuator.
Figure 5B:
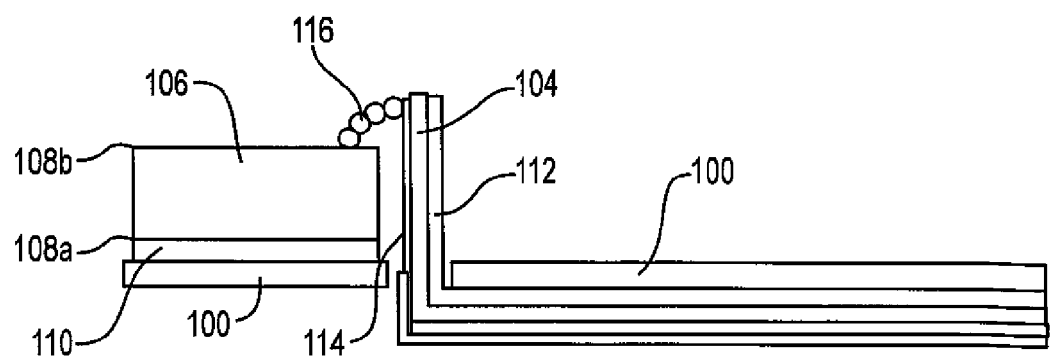
FIG. 5B is a side view of the microactuator connection.

FIGS. 5A and 5B illustrate an embodiment wherein the piezoelectric microactuator element is on a side opposite from the read/write head. FIG. 5A is a top view of a microactuator connection where the circuit is bent and passed through an aperture in the suspension to provide an electrical connection to the micro actuator, and FIG. 5B is a side view thereof.

When the microactuator element and read/write head are on opposite sides of the suspension arm, there are various manners by which the circuit can be routed so that it can make contact with the microactuator. One configuration to accomplish this is shown in FIGS. 5A and 5B where a suspension arm 100 has an aperture 102 therethrough that allows for circuit 104 to be passed therethrough from one side to the other. Piezoelectric microactuator 106 has lower contact surface 108a and upper contact surface 108b. An electrical connection to lower surface 108a is made via conducting adhesive 110 that attaches microactuator 106 to suspension arm 100. In this embodiment, an intermediate layer 112 (e.g., a thin semi-rigid metal, e.g., stainless steel) is present between circuit 104 and suspension arm 100. Intermediate layer 112 and circuit 104 are bent such that they extend from the side of suspension arm 100 opposite to microactuator element 106 to the same side as microactuator element 106. Circuit trace 114 of circuit 104 is now oriented near upper contact surface 108b of microactuator 106. In this embodiment, circuit trace 114 is oriented orthogonal to upper contact surface 108b of microactuator 106. A multi-ball solder bridge 116 forms an electrical connection between circuit trace 114 and microactuator upper contact surface 108b of microactuator 106.

Figure 6:
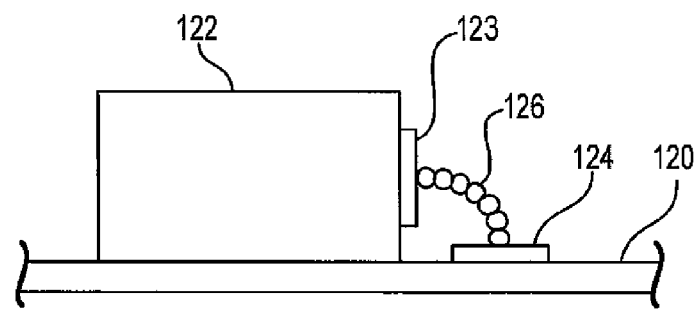
FIG. 6 is a side view of an embodiment of a solder ball bridge where an electrical connection is provided between an orthogonal slider and suspension arm.

FIG. 6 illustrates another embodiment where a solder ball bridge is used to electrically connect two orthogonal elements. In FIG. 6, the elements are a slider and the suspension arm supporting the slider.

Referring to FIG. 6, a solder bridge between elements of an HDD other than a microactuator is illustrated. Suspension arm 120 has slider 122 attached thereto, for example by an adhesive. A solder ball bridge 126 connects bonding pad 123 of slider 122 to bonding pad 124 on arm 120. Via solder ball bridge 126, slider 122 is electrically connected to (e.g., grounded to) suspension arm 120.

The solder ball bridges of this disclosure electrically connect at least two elements of a HDD system. The bridge spans a distance between the two elements of at least about 5 micrometers. In some embodiments, the distance spanned by the solder ball bridge is at least about 7 micrometers, and in other embodiments at least about 10 micrometers or at least about 15 micrometers.

The solder ball bridge may be unsupported between its two ends; that is, there is no structure in contact with the bridge between its two ends that supports the bridge or inhibits the solder ball bridge from collapsing, drooping or otherwise sagging. See for example FIG. 4, where although structural adhesive 75 is present in gap 84, adhesive 75 does not contact nor support solder ball bridge 86 across gap 84. Alternately, the solder ball bridge may be partially or fully supported between its ends. In these embodiments, any structure supporting the bridge is preferably electrically insulating or at least non-conducting. For example, the solder ball bridge may be at least partially built on structural adhesive present in the gap being spanned.

As described above, the solder ball bridges of this disclosure may connect two generally planar elements; FIG. 3 provides such an example with solder ball bridge 66. Although the two elements are generally co-planar, solder ball bridge 66 is arched and extends out from the plane of the elements. In other embodiments, such as where the bridge is supported, the bridge may not be arched. The solder ball bridge of this disclosure may alternately connect two uneven or non-planar elements; FIG. 5 provides such an example with solder ball bridge 86 of FIG. 5. The two elements may be vertically offset a distance h of, for example, at least about 15 micrometers (e.g., about 20 micrometers, or about 25 micrometers), although the vertical offset may be smaller or greater. Further, the solder ball bridge of the disclosure may connect two elements that have an angle therebetween that is between 0 (zero) degrees and 180 degrees; for example, the elements may be orthogonal or at a right angle to each other. FIGS. 5A and 5B and FIG. 6 provide examples of orthogonal elements being connected, with solder ball bridge 116 and solder ball bridge 126, respectively.

As indicated above, the solder ball bridge has at least two individually placed or positioned solder balls. The solder balls are in physical contact with each other, creating an electrically conductive connection. In some embodiments, particularly those where the bridge is unsupported, the solder ball bridge has at least three solder balls, or at least five solder balls. As specific examples, solder ball bridge 66 of FIG. 3 has five balls, solder ball bridge 86 of FIG. 4 has six balls, solder ball bridge 116 of FIGS. 5A, 5B has four balls, and solder ball bridge 126 of FIG. 6 has seven solder balls. Other examples of solder ball bridges include those having ten balls or even twenty balls. Bridges spanning orthogonal elements or close to orthogonal elements (e.g., bridge 116 and bridge 126) preferably have at least three solder balls. In most embodiments, all of the solder balls that form a bridge are the same size (i.e., within acceptable size deviation based on the method used to form and apply the balls), although in some embodiments, having multiple size solder balls may be desired.

Individual solder balls, prior to being positioned to form a bridge, typically have a diameter of about 30 micrometers to about 150 micrometers, preferably about 50 to 100 micrometers. Typically, individual balls are no smaller than about 30 micrometers in diameter, because smaller balls require more balls to span the same distance as larger balls, and more time is needed to position more balls than less balls. Also typically, individual balls are no larger than about 200 micrometers in diameter, because with larger balls it may be difficult to form and maintain a suspended bridge structure and undesirable heating may occur where the solder ball contacts the element (s) being connected. Examples of suitable size solder balls include 40 micrometers, 50 micrometers, 60 micrometers, and 80 micrometers, although of course other sizes are suitable. It should be understood that the solder balls may not be perfectly spherical, but instead, may be oblong, squashed, or otherwise deformed, having acceptable shape deviation based on the method used to form and apply the balls. Additionally, the solder material may neck between adjacent solder balls, creating a sinusoidal or otherwise undulating surface topography for the solder bridge.

The solder balls may be any suitable solder material, including conventional SnPb (tin-lead) and lead free solder, such as SnCu (tin-copper), SAC (tin-silver-copper), SnBi (tin-bismuth), ZnAl (zinc-aluminum), In (indium) and Sn (tin). Flux may or may not be present within the solder.

To form any of solder ball bridge 66 of FIG. 3, solder ball bridge 86 of FIG. 4, solder ball bridge 116 of FIGS. 5A, 5B, solder ball bridge 126 of FIG. 6 and other solder bridges according to this disclosure, conventional solder ball application processes may be used. The solder balls may be formed or placed in the desired location in many ways, including evaporation, electroplating, printing of molten solder, jetting of molten solder, stud bumping, and direct placement of solder balls. One particular process is referred to as Solder Jet® technology. The Solder Jet® process utilizes demand-mode ink-jet printing technology to place molten solder droplets where desired. It is preferred that the solder balls not be reflowed (e.g., melted) after placement.

The bridge is constructed by placing solder balls in physical contact with each other from one element to the other element across the gap to be spanned. In most embodiments, the length of the bridge will be built from a first end to the second end, although in some embodiments it may be desired to concurrently (simultaneously) or alternately build the bridge from both ends, meeting at the middle or elsewhere between the two ends.

Figure 7:
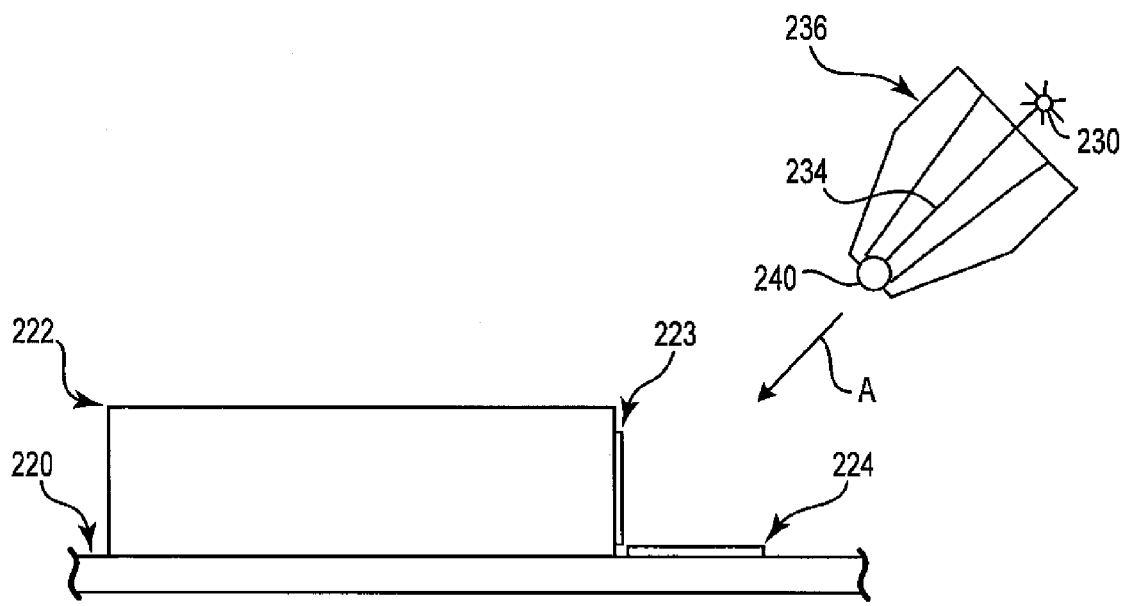
FIG. 7 is a side view of an embodiment of a method of forming a solder ball bridge.

FIG. 7 schematically illustrates a process for forming a solder ball bridge between two orthogonally positioned elements using a thermal interconnect (TIC) bonding process. In this particular embodiment, the solder ball bridge is being formed between a slider and grounding suspension arm.

Referring now to FIG. 7, suspension arm 220 has a slider 222 attached thereto, for example by an adhesive. Present on slider 222 is a bonding pad 223 and on suspension arm is a bonding pad 224. In one TIC process, beam 234 from laser 230 heats and melts solder ball 240. Capillary nozzle 236 is pressurized (e.g., with nitrogen) to propel the molten solder ball 240 toward either slider pad 223 or suspension pad 224, as illustrated by arrow A. Molten solder ball 240 strikes either slider pad 223 or suspension pad 224, adheres thereon and solidifies. A second solder ball 240 is subsequently melted and propelled to adhere to the first-placed solder ball. This second solder ball and any subsequent solder ball are positioned to be closer to the other contact pad, either pad 223 or 224, than is the first solder ball. Stated another way, the second and any subsequent solder ball is positioned so that the bridge leans towards the second contact pad, preferably forming an arch. The stack of solder balls will eventually contact the other pad and a solder ball bridge will have been formed between the pads 223, 224. In an alternate method, the solder balls are alternately deposited on slider pad 223 and suspension pad 224, so that the bridge arch meets between the two pads 223, 224.

It is understood that numerous variations of a solder ball bridge and methods of making a solder ball bridge could be made while maintaining the overall inventive design and remaining within the scope of the invention. Numerous alternate design or element features have been mentioned above.

Thus, embodiments of the SOLDER BALL BRIDGE, AND METHODS OF MAKING are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An electrical connection between a surface of a first element and a surface of a second element having a gap therebetween, the electrical connection comprising at least three solder balls in physical contact with each other, and extending across the gap to electrically connect the surface of the first element and the surface of the second element.

2. The electrical connection of claim 1 comprising at least five solder balls in physical contact with each other, the first element and the second element.

3. The electrical connection of claim 1 wherein each of the solder balls has a diameter of 30 to 150 micrometers.

4. The electrical connection of claim 1 wherein each of the solder balls has a diameter of 50 to 100 micrometers.

5. The electrical connection of claim 1 wherein the gap is at least 10 micrometers.

6. The electrical connection of claim 1 wherein the surface of the first element and the surface of the second element are co-planar.

7. The electrical connection of claim 1 wherein the surface of the first element and the surface of the second element are non-planar to each other.

8. The electrical connection of claim 7 wherein the surface of the first element and the surface of the second element are parallel to each other.

9. The electrical connection of claim 7 wherein the surface of the first element and the surface of the second element are orthogonal to each other.

10. A disc drive comprising:
a first element and a second element physically spaced from the first element; and
a solder ball bridge electrically connecting a surface of the first element with a surface of the second element, the solder ball bridge comprising at least three solder balls.

11. The disc drive of claim 10 wherein the solder ball bridge comprises at least five solder balls.

12. The disc drive of claim 10 wherein each of the solder balls has a diameter of 50 to 100 micrometers.

13. The disc drive of claim 10 wherein the first element is a piezoelectric microactuator.

14. The disc drive of claim 10 wherein the surface of the first element and the surface of the second element are co-planar.

15. The disc drive of claim 10 wherein the surface of the first element and the surface of the second element are non-planar to each other.

16. The disc drive of claim 15 wherein the surface of the first element and the surface of the second element are parallel to each other.

17. The disc drive of claim 15 wherein the surface of the first element and the surface of the second element are orthogonal to each other.

18. The disc drive of claim 15 wherein the solder ball bridge is unsupported between the first element and the second element.

19. A method of making an electrical connection in a disc drive between a first element and a second element, comprising:
attaching a first solder ball to the first element;
attaching a second solder ball to the second element; and
creating an electrical connection between the first element and the second element through the first solder ball and the second solder ball without reflowing the first solder ball or the second solder ball.

20. The method of claim 19 further comprising:
attaching a third solder ball to the first solder ball; and
creating the electrical connection between the first element and the second element through the first solder ball, the second solder ball, and the third solder ball.

* * * * *